June 6, 1961    W. C. EDDY, JR    2,987,054
VEHICLE CONTROL MECHANISM
Filed Oct. 23, 1959    3 Sheets-Sheet 1

INVENTOR.
WILLIAM C. EDDY, JR.
BY M. A. Hobbs
ATTORNEY

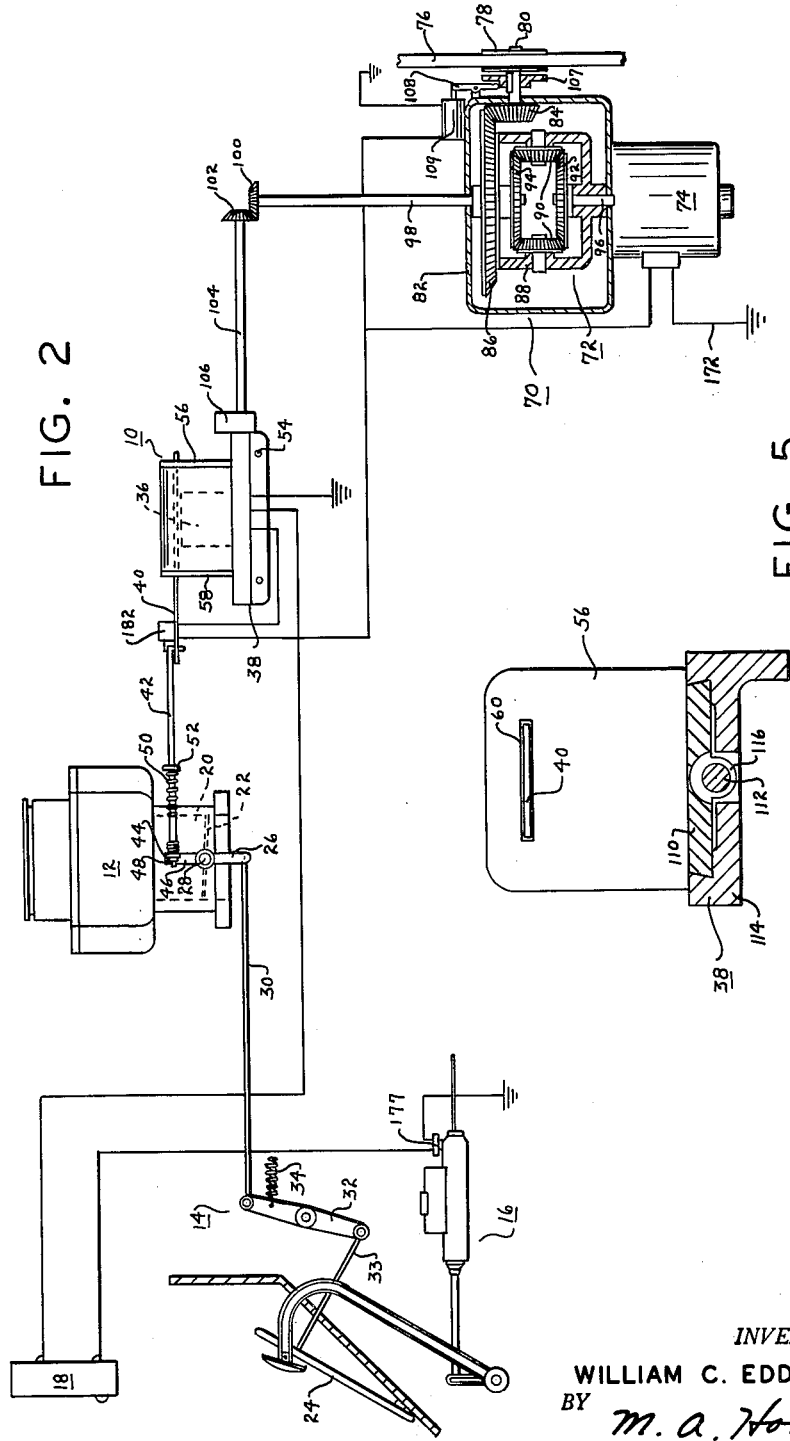

June 6, 1961  W. C. EDDY, JR  2,987,054
VEHICLE CONTROL MECHANISM
Filed Oct. 23, 1959  3 Sheets-Sheet 3

*INVENTOR.*
WILLIAM C. EDDY, JR.
BY M. A. Hobbs
ATTORNEY

2,987,054
Patented June 6, 1961

2,987,054
VEHICLE CONTROL MECHANISM
William C. Eddy, Jr., Tehran, Iran, assignor to Television Associates, Inc., Michigan City, Ind., a corporation of Illinois
Filed Oct. 23, 1959, Ser. No. 848,253
11 Claims. (Cl. 123—102)

The present invention relates to a control mechanism for a vehicle and more particularly to a mechanism for controlling the speed of a vehicle.

The principal object of the present invention is to provide a mechanism for maintaining a preselected vehicle speed irrespective of normal variations in the load placed upon the engine driving the vehicle.

Another object of the present invention is to provide a mechanism for regulating the speed of automobiles, trucks, buses and the like, which can be controlled directly by the driver to render the mechanism operative and inoperative and which will automatically become inoperative when the vehicle brakes are applied.

Another object of the invention is to provide a control mechanism for an internal combustion engine, which operates either to maintain the throttle in a fixed position regardless of engine load or vehicle speed or to vary the throttle setting in accordance with engine load and/or vehicle speed.

Still another object of the invention is to provide a mechanism for controlling the speed of an internal combustion engine, which can be readily installed on all standard or conventional internal combustion engines at the factory or in the field without any special tools, equipment or skill being required for the installation and without making any appreciable changes in the conventional or original control mechanism for the engine.

Another object is to provide a fixed and variable throttle control mechanism for an internal combustion engine which permits acceleration and deceleration of the engine at the will of the operator and which will take over the control of the engine to maintain the desired vehicle speed and relieve the driver of the normal constant operation of the acceleration pedal or lever.

Additional objects and advantages of the invention will become apparent from the following description and accompanying drawings, wherein:

FIGURE 2 is an elevational and diagrammatical view of my control mechanism showing the manner in which the mechanism is connected into the conventional parts of the engine and vehicle;

FIGURE 5 is an end elevational view and cross sectional view of the component shown in FIGURES 3 and 4, taken on line 5—5 of the latter figure;

Figure 1:
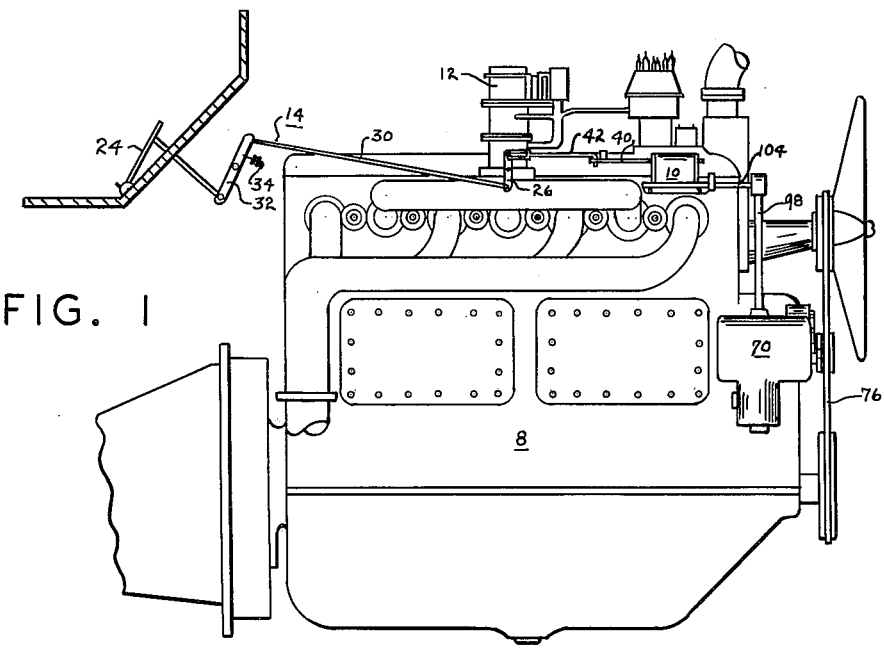
FIGURE 1 is a side elevational view of a conventional internal combustion engine for automobiles, showing my speed control mechanism mounted thereon.
Figure 4:
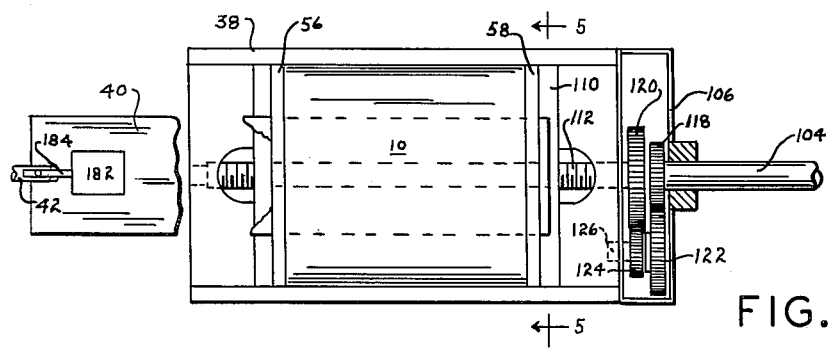
FIGURE 4 is a top plan view of the component shown in FIGURE 3.

Referring more specifically to the drawings and to FIGURES 1 and 2 in particular, numeral 8 designates an internal combustion engine for an automobile or small truck, numeral 10 my throttle holding unit, 12 a conventional carburetor mounted on the engine, 14 a conventional throttle control linkage, 16 a portion of a standard hydraulic brake system of the vehicle, and 18 the relay box of the electrical system for my controlling mechanism. Carburetor 12 contains an induction passage 20 having mounted therein a throttle valve 22 connected to accelerating pedal 24 by linkage 14 consisting of a lever 26 mounted on throttle shaft 28, rod 30, pivoted lever 32, and rod 33. A spring 34 connected to lever 32 and anchored on the engine or at some other suitable point in the engine compartment constantly urges the throttle control mechanism in the direction to close the throttle valve. For the purpose of the present description the internal combustion engine, including the carburetor, is a conventional engine of the type used in any one of the well known makes of automobiles or trucks, although the present mechanism may also be used to an advantage on some industrial and marine inboard engine installations. The carburetor shown is one of the down-draft, float type and may be either simple or multiple barrel.

The auxiliary throttle control mechanism 10 includes an electrical magnet 36 mounted on a base 38 and a sliding iron or steel bar 40 connected to throttle lever 26 by a rod 42 slidably journalled in a trunnion 44 mounted on an arm 46 of the throttle lever. A nut 48 threaded onto the end of rod 42 forms a one way connection between the arm of the throttle lever and rod 42. The trunnion is normally held against the nut by a spring 50 mounted on rod 42 and reacting between the trunnion and a fixed collar 52 on said rod. The effective length of rod 42 can be varied to suit requirements by screwing the nut either to the right or left as shown in FIGURE 2.

Base 38 on which magnet 36 is mounted is rigidly secured by bolts in holes 54 to the engine block or cylinder head of the engine or to some other part of the vehicle which will give it unyielding support. Two upstanding members 56 and 58 are on the base on either side of the magnet and are provided with slots 60 for guiding and retaining bar 40 in proper place over the magnet, said slots being sufficiently large to permit free movement of the bar in said slots when the magnet is deenergized. The magnet is a conventional electrical unit having an iron core surrounded by a copper coil, the core preferably being of pure iron or other material which will become demagnetized immediately upon deenergizing of the coil. The core supports bar 40 as the latter reciprocates with the movement of the throttle valve when the magnet is deenergized and holds said bar firmly in an immovable position whenever the coil is energized. Members 56 and 58, base 38 and bar 40 complete the electrical field for the magnet. When the bar is being held by the magnet, the throttle valve is held in a partially or fully opened position, as will be more fully explained hereinafter. The specific magnetic mechanism contained in unit 10 is not important to the present invention, either the type shown in my U.S. Patent No. 2,842,110, or in my U.S. Patent No. 2,916,116, being suitable for the present mechanism. The one shown in the first patent is the preferred form of holding magnet and control mechanism therefor, and since the unit is fully described in the patent, it will not be described in detail herein.

Since it is sometimes necessary to change the position of the throttle valve in order to compensate for variations in load placed upon the engine to maintain a desired speed, a speed responsive device 70 is included in the present mechanism consisting of a differential 72 of conventional construction and operation driven by the engine and by a D.C. electric motor 74. The differential in the installation shown is driven from the fan belt 76 through a pulley 78 and shaft 80 extending into housing 82. A pinion 84 on the end of shaft 80 drives the large bevel gear 86 mounted on and rotatable with the differential case 88. The case carries small bevel gears 90 which mesh with large bevel gears 92 and 94 secured to the inner ends of shafts 96 and 98, respectively. Shaft 98 is connected to unit 10 by beveled gears 100 and 102, shaft 104 and a gear reduction box 106 mounted on and forming a part of unit 10. Pulley 78 normally idles on shaft 80 except when my control mechanism is in operation, at which time the rotation of the pulley is transmitted to the shaft by a clutch plate 107 held in engagement with a clutch face on pulley 78 by a lever 108 operated by a solenoid 109.

Magnet 36 is secured to a longitudinally movable bed 110 in base 38 and is moved toward and away from the carburetor by a rotatable screw shaft 112 journalled in the stationary part 114 of the base and carrying a tap 116 secured to the bottom of bed 110. Shaft 112 is connected to the gear reduction box 106 and is driven at a reduced rate from speed responsive device 70 through shafts 98 and 104, and gears 100 and 102. Gear reduction box 106 contains a relatively small gear 118 on the end of shaft 104, a relatively large gear 120 on the end of shaft 112, and large and small gears 122 and 124 on shaft 126 intermeshing with gears 118 and 120, respectively. The ratio of gear sizes may be varied from one installation to another to satisfy requirements.

Figure 7:
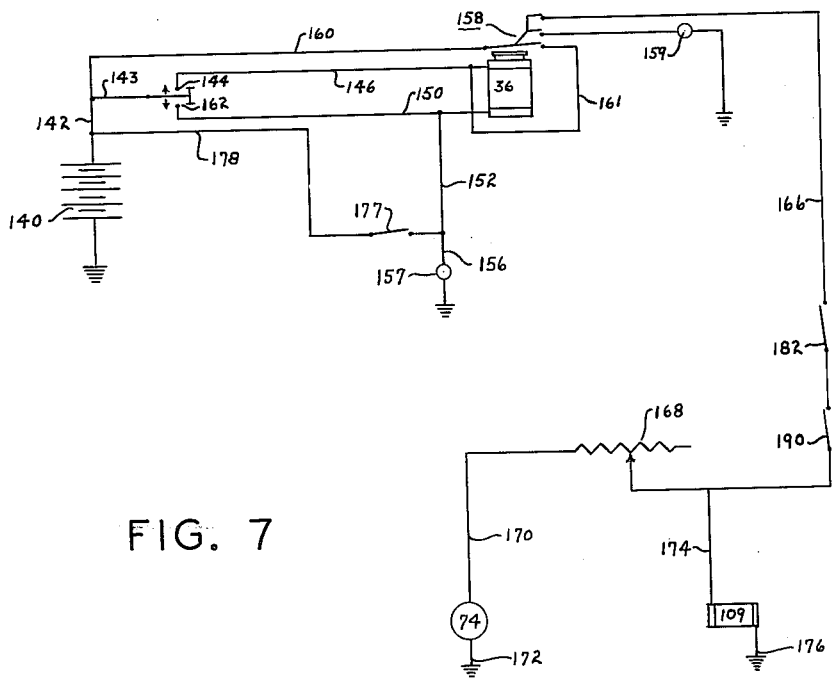
FIGURE 7 is a wiring diagram of the control circuit of the present mechanism.
Figure 6:
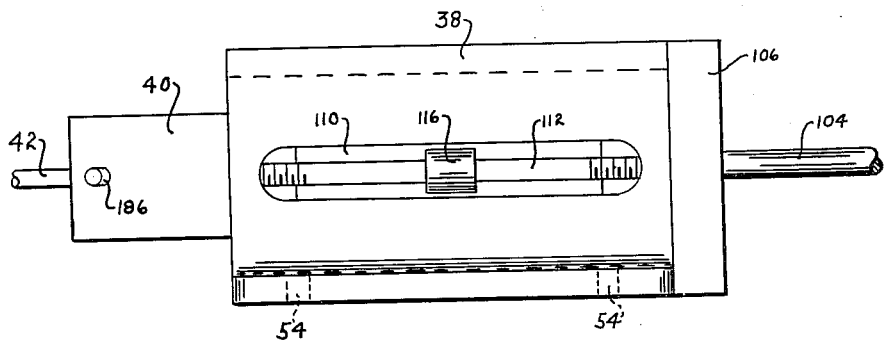
FIGURE 6 is a bottom view of the component shown in FIGURES 3, 4 and 5.

The electrical circuit for my throttle control mechanism is shown in FIGURE 7. The circuit for initially energizing electro-magnet 36 consists of a storage battery 140, leads 142 and 143, two-way manual control switch 144, lead 146, magnet 36, leads 150 and 152, and thence to ground through lead 156 of the tail light 157. The current through lead 156 is not sufficient to light the tail light. When magnet 36 is thus energized, switch 158 is closed completing the circuit to an indicator light 159 on the instrument panel and to a holding circuit for magnet 36 consisting of leads 142, 160, 161 and lead 146. The magnet will remain energized and switch 158 closed after manual control switch 144 is opened, and the throttle control mechanism holds the throttle in the position selected at the time the magnet was initially energized. Indicator light 159 remains on as long as the magnet is energized.

Motor 74 of unit 70 is controlled by a circuit consisting of leads 142 and 160, switch 158, lead 166, rheostat 168, lead 170 and ground 172. The rheostat, which is located on the instrument panel, is controlled by the driver to select the desired vehicle speed to be maintained after the throttle has been locked in a partially opened position by magnet 36 holding member 40. Solenoid 109 is also controlled by switch 158, leads 166 and 174, and ground 176. It is thus seen that when switch 158 is closed, the holding circuit for magnet 36 is energized, the circuit to indicator light 159 is closed, and the circuit to motor 74 and solenoid 109 is energized. When this takes place, magnet 36 holds member 40, motor 74 is operating, and solenoid 109 is holding clutch plate 107 in engagement with pulley 78.

While the engine is running at the constant preselected speed as determined by the setting of the rheostat, the throttle is held by magnet 36 at a fixed, partially opened position. Under this condition the speeds of the pulley 78 and shaft 80 are synchronized with the speed of motor 74 so that no rotative force is transmitted to gear 94 and shaft 98. With this condition prevailing, unit 10 remains stationary and holds the throttle in a fixed position. If the speed of the vehicle and consequently the engine should change as a result of increased load or an up or down grade on the road, i.e. if the speed of the engine should decrease, a rotative force is transmitted to gear 94 and shafts 98 and 104 to operate screw shaft 112 in the direction to move unit 10 to the right as seen in FIGURES 1 and 2 and thereby open the throttle an amount necessary to compensate for the increased load and return the vehicle to the desired speed. If the vehicle should increase its speed, shafts 98 and 104 are rotated in opposite directions to move unit 10 to the left and partially close the throttle.

Magnet 36 can be rendered inoperative and the throttle immediately released under any one of several different conditions. The driver can manually interrupt the operation of the throttle control mechanism by closing switch 162 which connects magnet 36 with battery 140 through leads 142, 143 and 150, completing a circuit bucking the holding circuit previously described and thus rendering the magnet inoperative. When this is done switch 158 opens and remains open until manual control switch 144 is again closed and the circuit controlled thereby completed as described above. When the driver applies the vehicle brakes, switch 177 is closed completing another circuit bucking the holding circuit, consisting of leads 142, 178, 152 and 150. Switch 177 may be operated mechanically or hydraulically such as shown in the above mentioned U.S. Patent No. 2,916,116. Whenever magnet 36 is deenergized by any one of the foregoing operations, motor 74 and solenoid 109 are simultaneously deenergized, thus rendering unit 70 inoperative.

Figure 3:
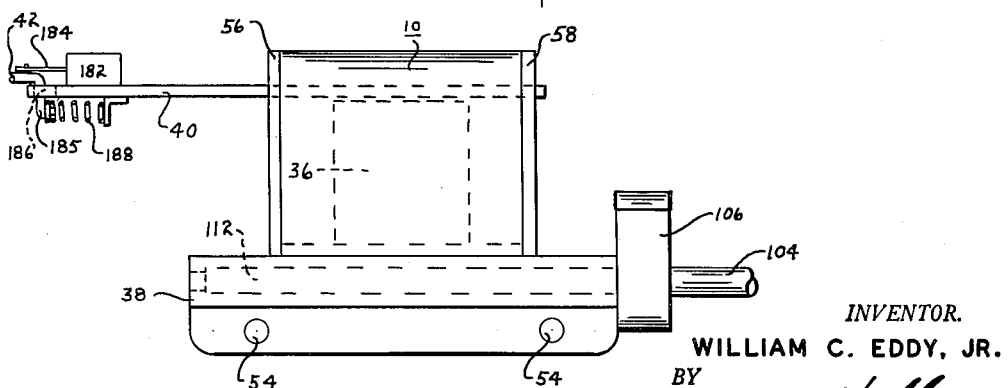
FIGURE 3 is a side elevational view of a component of my control mechanism.

In order to permit complete manual control of the throttle during acceleration without interference from speed responsive unit 70, after a setting has been selected on unit 10 and without interrupting the setting, a switch 182 in lead 166 is opened by rod 42 through arm 184 as pressure is applied to the rod as the throttle is opened by the driver. Switch 182 is shown mounted on bar 40 and connected to rod 42 by arm 184. Relative movement between the rod and bar for actuating the switch is provided by movement of the end 185 of rod 42 in a slot 186. Switch 182 is normally held in its closed position by the force of spring 34 tending to close the throttle. Opening of switch 182 disengages clutch 107 and stops motor 74. Magnet 36 remains energized, holding bar 40 in a fixed position and is ready to assume control of the throttle as soon as the driver removes his foot from the accelerating pedal. When the pedal is released and lever 46 returns to its original set position, switch 182 is again closed, thus starting motor 74 and reengaging clutch 107. To cause rod 42 and member 40 to move as a unit when the throttle is being initially set while magnet 36 is deenergized, a spring 188 urges rod end 185 to the left end of slot 186, as seen in FIGURE 3, said spring being readily overcome when the throttle is moved toward open position while the magnet is holding bar 40. A manually controlled switch 190 may also be included in lead 166 so that unit 70 can be rendered inoperative while continuing the operation of unit 10 to maintain a fixed throttle position, regardless of engine or vehicle speed.

In the operation of the automobile having one of the present auxiliary throttle control mechanisms installed thereon, the driver operates the vehicle in the usual manner until he manually brings the mechanism into operation by momentarily closing manual switch 144. Until this is done, the throttle valve of the carburetor is controlled exclusively by the acceleration pedal. As the pedal is pushed toward the floor board, throttle control linkage 14 rotates throttle lever 26 and extension 46 in a clockwise direction, as viewed in FIGURES 1 and 2, opening the throttle valve and simultaneously sliding rod 42 and bar 40 to the right. Spring 50 is not compressed and trunnion 44 and nut 48 move together, since bar 40 moves freely in slots 60 and on magnet 36 until the magnet is energized.

The driver can relieve himself of the constant manual operation of the accelerating pedal by actuating the auxiliary throttle control mechanism. This is done by first selecting with the accelerating pedal the desired opening of the throttle valve and then closing switch 144 on the instrument panel and setting the rheostat 168 at the desired speed. This energizes magnet 36, thus holding bar 40 firmly against the upper end of the magnet with sufficient force that the bar can not be moved by either spring 34 or spring 50. Hence the throttle valve is held in the selected partially open position against the force of spring 34 tending to return the valve to its closed position. When magnet 36 is energized the circuits to motor 74 and solenoid 109 are also completed, rendering unit 70 operable to control the speed of the engine in accordance with the setting selected on the rheostat. Unit 70 remains operable as long as magnet 36 is energized and switch 182 is closed.

If the driver wishes to accelerate to pass another vehicle, he merely pushes the accelerating pedal further toward the floor board, causing linkage 14 to rotate lever 26 further in the clockwise direction to open the throttle the desired amount. As lever 26 is rotated, extension 46 being integrally joined thereto is likewise rotated; however, since bar 40 is held firmly by magnet 36, trunnion 44 which is attached to extension 46 slides on rod 42 toward the right as seen in FIGURES 1 and 2, compressing spring 50, thus leaving bar 40 set in its preselected position on magnet 36. As spring 50 is initially compressed, switch 182 is opened, rendering unit 70 inoperable. When the driver wishes to return to the initially preselected speed, he merely removes his foot from the accelerating pedal and the throttle valve is returned to its partially opened position as determined by the position of the bar 40 on magnet 36 and unit 70 is again rendered operative.

Whenever the driver applies the vehicle brakes, switch 177, which is controlled by the brake, closes the circuit bucking the coil holding circuit, thus rendering the magnet inoperative, which thereupon releases bar 40 and opens the circuits to unit 70. When this bar is released spring 34 immediately returns the throttle valve to its closed position. If the driver at any time wants to render the auxiliary control mechanism inoperable, he merely momentarily closes switch 162 which renders the coil inoperative. Once the mechanism is rendered inoperable in either of the foregoing ways, switch 144 must again be closed to reactuate the mechanism after a desired throttle position has been established.

The present auxiliary throttle control mechanism, in addition to making long distance driving easier and more relaxing, provides a definite safety factor on slick roads and streets by permitting the driver to easily maintain a constant speed under such conditions without interfering with complete normal control of the vehicle in response to unexpected hazards. If the electrical system for the mechanism should develop trouble or be in any way interrupted in its operation, magnet 36 is immediately de-energized, thus freeing bar 40 and permitting the throttle to return to its closed position. This is an important safety feature of the present mechanism.

While only one embodiment of my mechanism has been described herein, various changes and arrangements and substitution of equivalent parts and means may be made if desired. For example, the two units 10 and 70 may be assembled in a single housing as a compact unit which can easily be mounted on an engine without any changes in the engine construction being required. Further, in order to facilitate installation of the present device on automobiles, trucks and buses already in service, bar 40 may be connected to the throttle lever by a Bowden wire or the like, thus permitting unit 10 to be mounted on the engine at a place remote from the carburetor. Other changes and modifications may be made without departing from the scope of the present invention.

I claim:

1. A mechanism for automatically controlling the throttle of an internal combustion engine in accordance with a preselected vehicle speed, comprising a magnetic attractable movable bar, a linkage for connecting said bar with the throttle, an electro-magnetic means for holding said bar in preselected positions and being movable to increase and decrease the opening of the throttle, means in said linkage yieldable to pressures tending to open the throttle, a differential mechanism having two power input means and one power output means, a means for driving one of said input means in accordance with engine speed, a D.C. electric motor for driving the other of said input means, a means connecting said mechanism with said magnetic means for varying the position of said magnetic means and thereby varying the position of the throttle in the direction and in an amount necessary to maintain a preselected vehicle speed, an electric circuit for said magnetic means and said motor having a switch therein for rendering said motor inoperable when pressure is applied to said linkage while said magnetic means is holding said magnetic attractable bar, and a rheostat for varying the speed of said motor.

2. A mechanism for automatically controlling the throttle of an internal combustion engine in accordance with a preselected engine speed, comprising a magnetic attractable movable bar, a linkage for connecting said bar with the throttle, an electro-magnetic means for holding said bar in preselected positions and being movable to increase and decrease the opening of the throttle, means in said linkage yieldable to pressures tending to open the throttle, means for varying the position of said magnetic means and consequently the position of the throttle to maintain a preselected engine speed, said last mentioned means including a differential mechanism having two power input means and one power output means, a means for driving one of said input means in accordance with engine speed, a D.C. electric motor for driving the other of said input means, a means connecting said mechanism with said magnetic means for varying the position of said magnetic means and thereby varying the position of the throttle, an electric circuit for said magnetic means and said motor having a switch therein for rendering said motor inoperable when pressure is applied to said linkage while said magnetic means is holding said magnetic attractable bar, and a rheostat for varying the speed of said motor.

3. A mechanism for automatically controlling the throttle of an internal combustion engine in accordance with a preselected engine speed, comprising a magnetic attractable movable member, a linkage for connecting said member with the throttle, an electro-magnetic means for holding said member in preselected positions and being movable to increase and decrease the opening of the throttle, means in said linkage yieldable to pressures tending to open the throttle, a differential mechanism having two power input means and one power output means, a means for driving one of said input means in accordance with engine speed, a D.C. electric motor for driving the other of said input means, a means connecting said mechanism with said magnetic means for varying the position of said magnetic means and thereby varying the position of the throttle, and an electric circuit for said magnetic means and said motor having a switch therein for rendering said motor inoperable when pressure is applied to said linkage while said magnetic means is holding said magnetic attractable member.

4. A mechanism for automatically controlling the throttle of an internal combustion engine in accordance with a preselected engine speed, comprising a magnetic attractable movable member, a linkage for connecting said member with the throttle, an electro-magnetic means for holding said member in preselected positions and being movable to increase and decrease the opening of the throttle, means in said linkage yieldable to pressures tending to open the throttle, a differential mechanism having two power input means and one power output means, a means for driving one of said input means in accordance with engine speed, a D.C. electric motor for driving the other of said input means, a means connecting said mechanism with said magnetic means for varying the position of said magnetic means and thereby varying the position of the throttle, and an electric circuit for said magnetic means and said motor having a rheostat for varying the speed of said motor.

5. A mechanism for automatically controlling the throttle of an internal combustion engine in accordance with a preselected engine speed, comprising a magnetic attractable movable member, a linkage for connecting said member with the throttle, a magnetic means for holding said member in preselected positions and being movable to increase and decrease the opening of the throttle, means in said linkage yieldable to pressure tending to open the throttle, a differential mechanism having two power input means and one power output means, a means for driving one of said input means in accordance with engine speed, an electric motor for driving the other of said input means, a means connecting said mechanism with said magnetic means for varying the position of said magnetic means and thereby varying the position of the throttle, and an electric circuit for said magnetic means and said motor having a means for varying the speed of said motor.

6. A mechanism for automatically controlling the throttle of an internal combustion engine in accordance with a preselected engine speed, comprising a magnetic attractable movable member, a linkage for connecting said member with the throttle, a magnetic means for holding said member in preselected positions and being movable to increase and decrease the opening of the throttle, means in said linkage yieldable to pressures tending to open the throttle, a differential mechanism having two power input means and one power output means, a means for driving one of said input means in accordance with engine speed, an electric motor for driving the other of said input means, and a means connecting said mechanism with said magnetic means for varying the position of said magnetic means and thereby varying the position of the throttle in the direction and in an amount necessary to maintain a preselected engine speed.

7. A mechanism for automatically controlling the throttle of an internal combustion engine in accordance with a preselected engine speed, comprising a movable member, a linkage for connecting said member with the throttle, magnetic means for holding said member in preselected positions and being movable to increase and decrease the opening of the throttle, means in said linkage yieldable to pressures tending to open the throttle, a differential mechanism having two power input means and one power output means, a means for driving one of said input means in accordance with engine speed, an electric motor for driving the other of said input means, a means connecting said mechanism with said magnetic means for varying the position of said magnetic means and thereby varying the position of the throttle, an electric circuit for said magnetic means and said motor having a switch therein for rendering said motor inoperable when pressure is applied to said linkage while said magnetic means is holding said movable member, and a means for varying the speed of said motor.

8. A mechanism for automatically controlling the throttle of an internal combustion engine in accordance with a preselected engine speed, comprising a movable member, a linkage for connecting said member with the throttle, means for holding said member in preselected positions and being movable to increase and decrease the opening of the throttle, a differential mechanism having two power input means and one power output means, a means for driving one of said input means in accordance with engine speed, an electric motor for driving the other of said input means, a means connecting said mechanism with said holding means for varying the position of said holding means and thereby varying the position of the throttle, and an electric circuit for said motor having a means for varying the speed of said motor.

9. In a mechanism for automatically controlling the throttle of an internal combustion engine in accordance with a preselected speed: a movable member, a linkage for connecting said member with the throttle, means for holding said member in preselected positions and being movable to increase and decrease the opening of the throttle, a differential mechanism having two power input means and one power output means, a means for driving one of said input means in accordance with engine speed, an electric motor for driving the other of said input means, and a means connecting said mechanism with said holding means for varying the position of said holding means and thereby varying the position of the throttle.

10. In a mechanism for automatically controlling the throttle of an internal combustion engine in accordance with a preselected speed: a differential mechanism having two power input means and one power output means, a means for driving one of said input means in accordance with engine speed, an electric motor for driving the other of said input means, a means connecting said mechanism with the throttle for varying the position thereof, and an electric circuit for said motor having a means for varying the speed thereof.

11. In a mechanism for automatically controlling the throttle of an internal combustion engine in accordance with a preselected speed: a member, a linkage for connecting said member with the throttle, means for holding said member in preselected positions movable to increase and decrease the opening of the throttle, a differential mechanism having two power input means and one power output means, a means for driving one of said input means in accordance with engine speed, an electric motor for driving the other of said input means, and a means connecting said mechanism with said member for varying the position of said member and thereby varying the position of the throttle.

References Cited in the file of this patent

UNITED STATES PATENTS

| | | |
|---|---|---|
| 2,911,077 | Carter | Nov. 3, 1959 |
| 2,912,058 | Sandor | Nov. 10, 1959 |